United States Patent
Yeom

(10) Patent No.: US 10,147,101 B2
(45) Date of Patent: Dec. 4, 2018

(54) METHOD OF GENERATING SOCIAL MARKETING GROUP INFORMATION OF EACH AFFILIATE STORE IN WHICH CREDIT CARD PAYMENT INFORMATION IS ASSOCIATED WITH SOCIAL NETWORK INFORMATION AND AFTER-MARKETING METHOD INTENDED FOR SOCIAL MARKETING GROUP

(76) Inventor: Suk Hwan Yeom, Seoul (KR)

( * ) Notice: Subject to any disclaimer, the term of this patent is extended or adjusted under 35 U.S.C. 154(b) by 178 days.

(21) Appl. No.: 13/996,309

(22) PCT Filed: Nov. 9, 2011

(86) PCT No.: PCT/KR2011/008495
§ 371 (c)(1),
(2), (4) Date: Jul. 11, 2013

(87) PCT Pub. No.: WO2012/086923
PCT Pub. Date: Jun. 28, 2012

(65) Prior Publication Data
US 2013/0282432 A1    Oct. 24, 2013

(30) Foreign Application Priority Data
Dec. 21, 2010    (KR) .................... 10-2010-0131524

(51) Int. Cl.
*G06Q 30/02*    (2012.01)
*G06Q 50/00*    (2012.01)

(52) U.S. Cl.
CPC ......... *G06Q 30/0201* (2013.01); *G06Q 50/01* (2013.01)

(58) Field of Classification Search
CPC ..... G06Q 30/02; G06Q 30/0201; G06Q 50/01
See application file for complete search history.

(56) References Cited

U.S. PATENT DOCUMENTS

2008/0255989 A1    10/2008  Altberg et al.
2009/0132375 A1*   5/2009   Weathersby .................... 705/14
(Continued)

FOREIGN PATENT DOCUMENTS

JP    2010165244      7/2010
KR    1020020094340  12/2002
(Continued)

OTHER PUBLICATIONS

Official Journal EPO, "Examination of computer-implemented inventions at the European Patent Office with particular attention to computer-implemented business methods", Nov. 2007, 9 pages.
(Continued)

*Primary Examiner* — Sujay Koneru
(74) *Attorney, Agent, or Firm* — Lee, Hong, Degerman, Kang & Waimey

(57) ABSTRACT

Disclosed are a method of generating social marketing group information of each affiliate store in which credit card payment information is associated with social network information and an after-marketing method intended for a social marketing group. A personal connection-based consumption group is formed by combining credit card members who are a consumption group with social network subscribers who are a personal connection group, and marketing intended for the person connection-based consumption group is conducted. A plurality of social marketing groups are formed for each affiliate store using credit card payment information and social network information. When a member of the social marketing group purchases a product or service in the affiliate store, the affiliate store provides purchasers belonging to the social marketing group with a benefit as the price for advertising expenses. Thus, it is possible to overcome the constraints in item of a product or service, the number of purchases, or time, which are problems of conventional (Continued)

social commerce, network marketing, and group purchase. Since credit card members having a personal interchange relation through a social network service form a marketing group for each affiliate, a consumption group is formed which is strong in purchasing power and high in information transfer power and reliability. Thus, customers can receive more benefits or services. In addition, a seller (advertiser) can conduct efficient advertising at low cost and secure a purchaser group having high loyalty.

14 Claims, 10 Drawing Sheets

(56) References Cited

U.S. PATENT DOCUMENTS

| | | | |
|---|---|---|---|
| 2010/0114783 A1* | 5/2010 | Spolar | 705/80 |
| 2010/0257028 A1* | 10/2010 | Hillerbrand | G06Q 10/067 |
| | | | 705/319 |
| 2010/0262456 A1* | 10/2010 | Feng | G06Q 30/02 |
| | | | 705/14.3 |
| 2010/0312649 A1* | 12/2010 | Lurie | 705/14.66 |
| 2011/0137994 A1* | 6/2011 | Kumar et al. | 709/204 |
| 2011/0231240 A1* | 9/2011 | Schoen | G06Q 30/0242 |
| | | | 705/14.41 |

FOREIGN PATENT DOCUMENTS

| | | |
|---|---|---|
| KR | 1020090112535 | 10/2008 |
| KR | 1020100028851 | 3/2010 |

OTHER PUBLICATIONS

European Patent Office Application Serial No. 11852127.7, Office Action dated Jul. 3, 2017, 6 pages.

European Patent Office Application Serial No. 11852127.7, Search Report dated Oct. 24, 2014, 4 pages.

Korean Intellectual Property Office Application Serial No. 10-2010-0131524, Office Action dated May 24, 2011, 2 pages.

PCT International Application No. PCT/KR2011/008495, Written Opinion of the International Searching Authority dated May 18, 2012, 6 pages.

\* cited by examiner

METHOD OF GENERATING SOCIAL MARKETING GROUP INFORMATION OF EACH AFFILIATE STORE IN WHICH CREDIT CARD PAYMENT INFORMATION IS ASSOCIATED WITH SOCIAL NETWORK INFORMATION AND AFTER-MARKETING METHOD INTENDED FOR SOCIAL MARKETING GROUP

TECHNICAL FIELD

The present invention relates to an online marketing method, and more particularly, to a method of generating social marketing group information in which credit card payment information is associated with social network information (online personal connection information) and an after-marketing method based on social marketing group information.

BACKGROUND ART

As a conventional marketing means for attracting customers, advertising using public television broadcasting, cable television broadcasting, radio broadcasting, newspapers, or various magazines have been usually used as shown in FIG. 1 for explaining a customer attracting form using a conventional marketing means. However, with the spread of the Internet, keyword advertising, search engine banner advertising, certain site advertising, e-mail advertising, pop-up advertising, event advertising, overture advertising, community advertising, giveaway advertising, and the like have been used online.

As an advertising means has been diversified, an advertiser's advertising expense increases, leading to an increase in a product price. That is, customers defray advertising expenses.

In particular, in case of online marking, event advertisings intended for unspecified individuals are generally used to induce customers to purchase products or services, however, an effect of such event advertising is temporary. In order to continuously maintain a marketing effect, a huge amount of marketing expenses should be continuously injected, nevertheless, it is difficult to accurately calculate an advertising effect.

Due to the above problem, social commerce using word-out-mouth marketing (WOMM) has recently become popular. There exist social commerce of various forms such as a business model in which a producer constructs social commerce by himself/herself as a sort of online group purchase, a social shopping mall in which a group purchase business model is combined with a social network, a membership social shopping mall having a membership system, a social commerce open market in which a commerce platform combined with a social network is open to public and anyone is allowed to register product selling information.

Further, as new types of marketing methods, suggested have been a method of paying a part of operating expense and revenue to a member who introduced a member who purchased a product or service as a point (see Korean Patent Publication No. 2002-83022) and a method of comparing two or more product selling conditions received from two or more affiliate stores that provide product selling conditions intended for members of a community group established in cooperation with two or more clients, and selecting an affiliate store corresponding to the community group (see Korean Patent Publication No. 2006-62674).

The social commerce is advantages since sellers can reduce advertising expenses and customers can purchase products at a low price. However, online space (shopping mall) should be constructed, and customers are required to participate in product promotion through a social network so that a predetermined number of products can be sold. In addition, the number of purchasers who purchased the same product should exceed a number suggested by the seller, and it is a sort of event. Thus, it is difficult to continuously apply the social commerce to general products or services.

That is, a purchaser's choice is limited to a group purchase product or service suggested by a seller.

Further, in the social commerce, sales increase in proportion to the number of participating purchasers, however, a network of purchasers is not formed.

In addition, the method of providing a point to high-ranking members is a sort of pyramid type marketing, which is also called network marketing. Further, the method is a marketing method of promoting a certain product to a certain purchaser. The seller has to share a profit with high-ranking members, and thus a marketing range is extremely limited. That is, since a high-ranking purchaser and a low-ranking purchaser have a one-to-one correspondence relation, a marketing target and range are extremely limited.

Furthermore, since a product or service to sell is limited to a product or service that can be applied to pyramid type marketing, a purchaser's choice is limited.

Meanwhile, the affiliate store selecting method is also a sort of group purchase. It is similar to a public tender since a plurality of affiliate stores suggest selling conditions to the members of the community group, and the affiliate store is selected by a comparison of the selling condition information. A community member and an affiliate store that provides a product or service have a one-to-one correspondence relation. Thus, even in the affiliate store selecting method, a marketing target and range are extremely limited.

In particular, the recommendation of people around a purchaser such as a family, a company colleague, and a friend has great influence on selection of a product or service, and most of purchases are made through such recommendation.

However, in sellers' view, sales increase by such recommendation, nevertheless, any benefit is not given to a recommender that recommends people around him/her to purchase a seller's product or service.

For example, let us assume that a person A who desires to have a meeting around a station D requested a person B who frequently has a meeting around the station D to recommend a meeting place, and the person B recommended a restaurant C. In this case, the restaurant C does not give any profit to the person B even though sales occurred by the person B's recommendation.

A concrete description will be made with reference to FIG. 2 for explaining an example of analyzing a network of purchasers with respect to a seller. Personal connections of customers who visit stores of a franchise company having about 60 stores in Korea were analyzed with customers' consent. All visitors were grouped into 13 groups. As a result of analysis, the following was found. In 8 groups among 13 groups, a network was formed between groups. In the remaining 5 groups, any relation is not made between groups, that is, any network was not formed between groups.

Sales, occurred by high-ranking 4 groups, occupied about 54% of a total of sales, and sales, occurred by the 8 groups having a network therebetween, occupied about 80% of a total of sales.

That is, it was found that about 80% of sales have occurred by purchasers having a network formed therebetween. It was evaluated that if customers belonging to the 8 groups receive a bad impression or are not satisfied with a service, a total of sales is reduced by about 14%, whereas if customers belonging to the 8 groups are provided with a good service, a total of sales increases by about 10%.

As described above, there is a problem in that it is difficult to concretely grasp a network of customers even though a network of customers is important to sellers.

DISCLOSURE

Technical Problem

The present invention is made in light of the above problems, and it is an object of the present invention to provide a method of generating social marketing group information, which is capable of overcoming the constraints in item of a product or service, the number of purchases, or time, which are the problems of the conventional social commerce, the conventional network marketing, and the conventional affiliate store selecting method, and generating information of a social marketing group, a marketing target group, which is high in effect against marketing expenses.

It is another object to provide a method capable of forming a network of purchasers (customers) and increasing a seller's recognition and sales through a network of purchasers.

It is still another object to provide a method capable of analyzing a consumption pattern of a customer group through a network of purchasers.

It is still another object to provide a method capable of increasing a purchaser's repurchase rate by providing purchasers belonging to a social marketing group formed based on an affiliate store with a predetermined benefit as the price for promotion, and enabling marketing to be more actively conducted through online interchange between individuals.

Technical Solution

One aspect of the present invention provides a method of generating social marketing group information, in which credit card payment information is associated with social network information, used for online after-marketing, including: at a social network service server that provides a social network service, obtaining consent to a use of subscriber information from a social network service subscriber; at a credit card company server, receiving credit card payment information from a credit card payment means installed in an affiliate store, generating a purchase member list of each affiliate store, and transmits the purchase member list to a social marketing server; at the social marketing server, extracting a social network service subscriber from the purchase member list in cooperation with the social network service server and requesting the social network service server to transmit a personal connection list of a purchase member (reference member) when the purchase member is the social network service subscriber; at the social network service server, transmitting the personal connection list which is a list of other subscribers with whom the purchase member has an interchange relation to the social marketing server; and at the social marketing server, checking whether or not social network service subscribers included in the personal connection list received from the social network service server are credit card members in cooperation with the credit card server, extracting credit card members included in the personal connection list, generating information of a social marketing group of the purchase member (reference member) of each affiliate store composed of the credit card members extracted from the personal connection list, and storing the information of the social marketing group in a database.

The social network service server may include a plurality of social network service servers that provide different social network services from each other, and the social marketing server may receive personal connection lists of purchase members (reference members) from the plurality of social network service servers.

The credit card payment means may be any one of a credit card reader, a point of sale (POS) system, and an internal credit card payment means.

The method of generating the social marketing group information may further include, at the social marketing server, providing information of the social marketing group to the credit card members (social network service subscribers) belonging to the social marketing group and the affiliate store.

Another aspect of the present invention provides an after-marketing method using the information of the social marketing group generated by the method of generating the social marketing group information, including: at the credit card company server, storing the information of the social marketing group received and updated from the social marketing server and constructing a database; at the credit card company server, receiving credit card payment information including payment time information and payment amount information of a plurality of credit card members from the credit card payment means installed in each of a plurality of affiliate stores, and storing purchaser list information for each affiliate store; at the credit card company server, comparing the information of the social marketing group of the same affiliate store as the purchase list information stored for each affiliate store with the purchaser list, and extracting a social marketing purchaser belonging to the social marketing group from the purchaser list; and at the credit card company server, deciding a beneficiary from among members of the social marketing group using information of the social marketing purchaser, and providing the decided beneficiary with a benefit provided from the affiliate store.

The credit card payment information may further include product information about a product sold in the affiliate store, and the benefit may be provided to the beneficiary based on a sold product according to the product information included in the credit card payment information.

The benefit may be decided based on a total of the amount of purchases made by the social marketing group during a predetermined time period.

A purchase member (reference member) who became a reference when the information of the social marketing group is generated may be decided as a beneficiary who receives a benefit for the amount of purchases of the social marketing group.

Still another aspect of the present invention provides an after-marketing method using the information of the social marketing group generated by the method of generating the social marketing group information, including: at the credit card company server, receiving credit card payment information including payment time information and payment amount information of a plurality of credit card members from the credit card payment means installed in each of a plurality of affiliate stores, and storing purchaser list information for each affiliate store; at the credit card company server, providing the purchaser list information stored for each affiliate store to the social marketing server; at the social marketing server, comparing the information of the social marketing group of the same affiliate store as the purchase list information with the purchaser list, and extracting a social marketing purchaser belonging to the social marketing group from the purchaser list; and at the social marketing server, providing information of the extracted social marketing purchaser to the credit card company server; and at the credit card company server, deciding a beneficiary from among members of the social marketing group using information of the social marketing purchaser, and providing the decided beneficiary with a benefit provided from the affiliate store.

The credit card payment information may further include product information about a product sold in the affiliate store, and the benefit may be provided to the beneficiary based on a sold product according to the product information included in the credit card payment information.

The benefit may be decided based on a total of the amount of purchases made by the social marketing group during a predetermined time period.

A purchase member (reference member) who became a reference when the information of the social marketing group is generated may be decided as a beneficiary who receives a benefit for the amount of purchases of the social marketing group.

Advantageous Effects

According to the present invention, information of a social marketing group composed of a purchaser who is a member of a credit card company and members of the credit card company with whom the purchaser has a personal interchange relation online is generated for each affiliate store using both credit card payment information and social network information. The purchaser can easily form a consumption group for a seller (affiliate store) together with acquaintances having the same credit card, and the purchaser can receive more benefits or services from the seller through the social marketing group.

The seller (affiliate store) can easily find a marketing target who is high in purchase possibility and can increase sales, and can secure a purchase group having high loyalty. The selling store (affiliate store) provides purchaser belonging to the social marketing group with a benefit as the price for advertising expenses (hereinafter, referred to simply as "benefit"). Thus, the purchasers' repurchase rate increases, and promotion for the selling store can be more actively conducted through an online personal connection relation.

The purchasers belong to the social marketing group promote the affiliate store to other non-purchasers with whom they have a personal connection relation online through word of mouth or a social network service and induces the non-purchasers to purchase, and the purchasers can receive more benefits as the price for promotion of the affiliate store.

In addition, the affiliate store is promoted by the social network service or word of mouth between customers belonging to a consumption group without using a separate promotion means, and thus its sales increases. The affiliate store can recognize a consumption group having a high repurchase rate, and can grasp a consumption pattern of a corresponding social marketing group by analyzing the consumption pattern of the social marketing group. Thus, the affiliate store can conduct effective marketing.

The credit card company can expect an increase in credit card use by the social marketing group having its credit card, an increase in the number of credit card members, and an increase in credit card payment commission received from the affiliate store due to an increase in credit card use by credit card members.

Furthermore, according to the present invention, it is possible to overcome the constraints in item of a product or service, the number of purchases, and time, which are the problems of the conventional social commerce, the conventional network marketing, and the conventional affiliate store selecting method.

DESCRIPTION OF MAJOR SYMBOL IN THE ABOVE FIGURES

Figure 1:
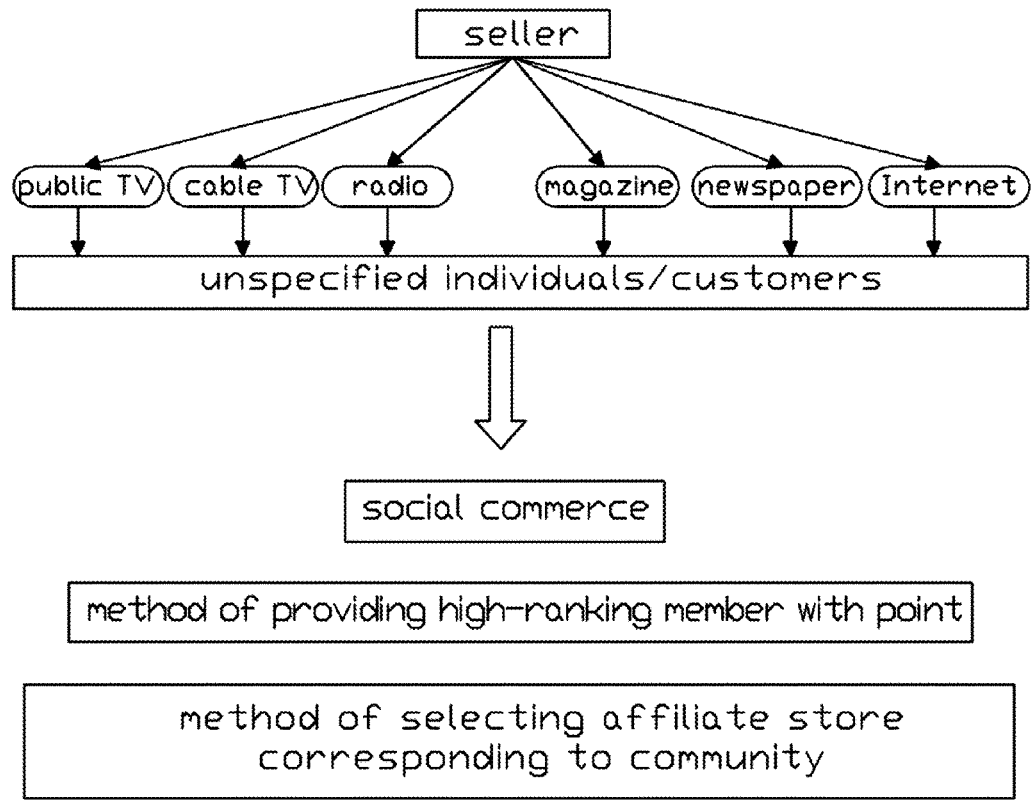
FIG. 1 is a diagram for explaining a customer attracting form using a conventional marketing means.
Figure 2:
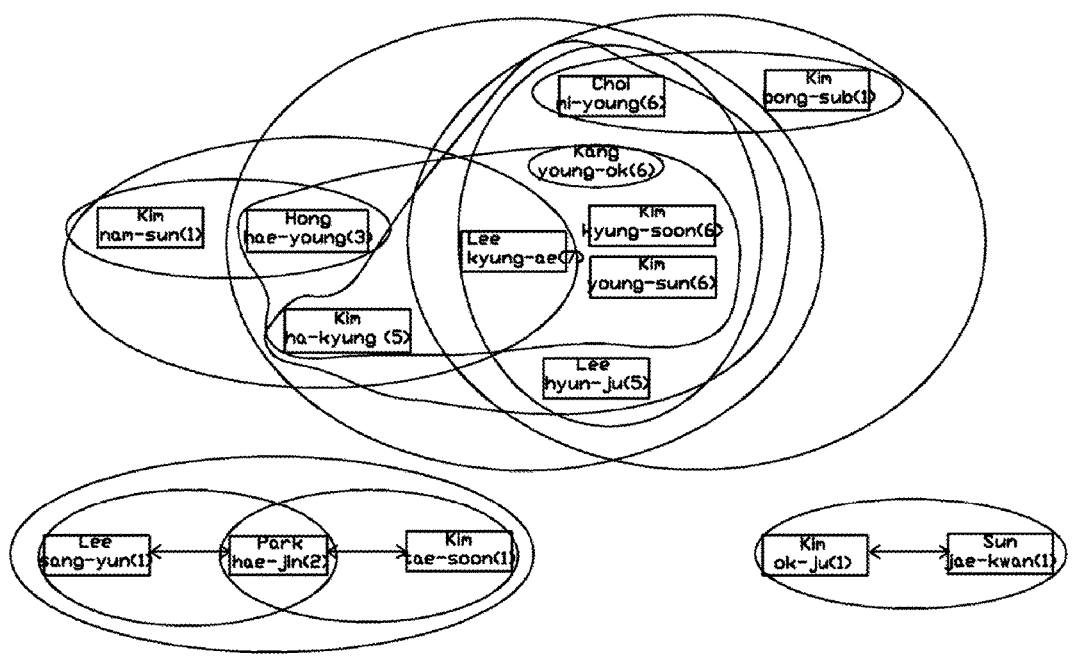
FIG. 2 is a diagram for explaining an example of analyzing a network of purchasers with respect to a seller.

10: Social network Service
20: Credit card company server
30: Social marketing server
40: Internet network
110: Social network service subscriber
210: Credit card payment means
220: Purchase member list
230: member information database

240: Social marketing group database (at credit card company server
250: Affiliate store purchaser database
310: Subscriber extracted from purchase member list
320: Social marketing group
330: Social marketing group database (at social marketing server side)
340: Social marketing purchaser database

MODE FOR INVENTION

Hereinafter, exemplary embodiments of a method of generating social marketing group information of each affiliate store in which credit card payment information is associated with social network information, and an after-marketing method intended for social marketing group according to the present invention will be described in detail with reference to the accompanying drawings.

First, a method of generating social marketing group information of each affiliate store in which credit card payment information is associated with social network information according to the present invention will be described with reference to FIGS. 3 to 5.

Figure 3:
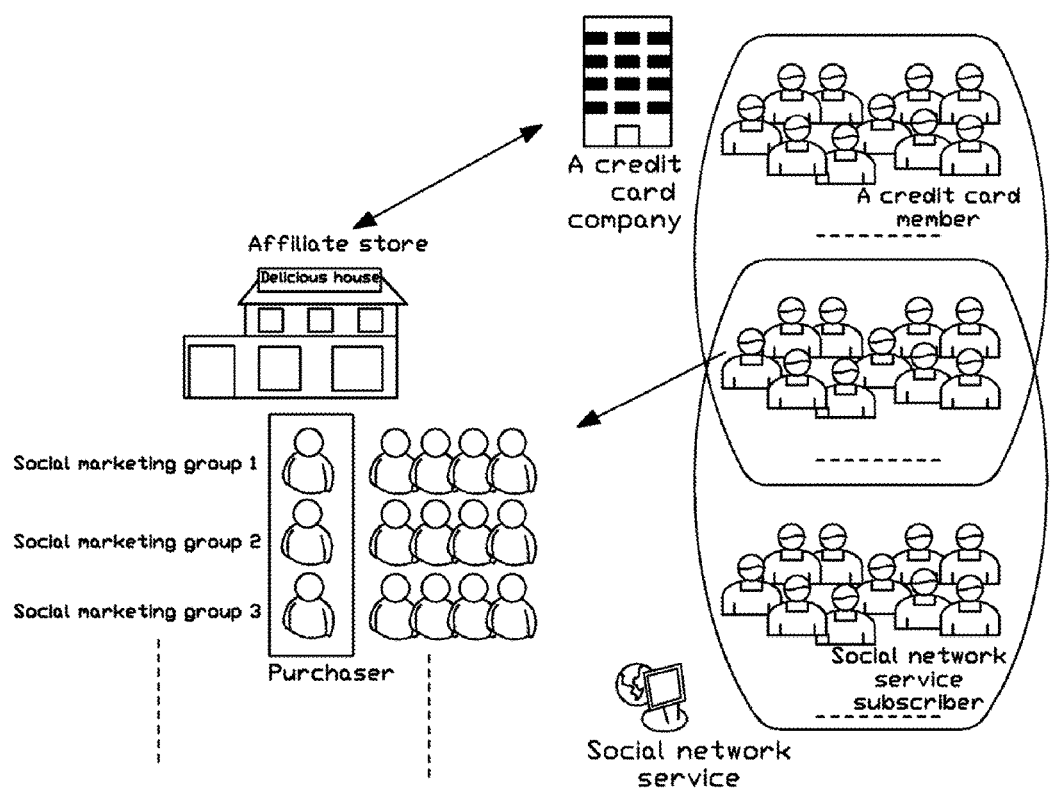
FIG. 3 is a conceptual diagram for explaining a method of generating social marketing group information of each affiliate store in which credit card payment information is associated with social network information, and an after-marketing method intended for a social marketing group according to the present invention.

FIG. 3 is a conceptual diagram for explaining a method of generating social marketing group information of each affiliate store in which credit card payment information is associated with social network information, and an after-marketing method intended for a social marketing group according to the present invention. As shown in FIG. 3, a basic feature of the present invention lies in that a marketing group is formed centering on an existing purchaser of a selling store (an affiliate store) using the purchaser' online personal connection (network) information.

In particular, credit card members which is a consumption group are associated with social network service (SNS) subscribers which is a personal connection group in units of stores (affiliate stores), and a new type of consumption group (social marketing group) composed of an existing purchaser who is a credit card member and acquaintances of the existing purchaser by a social network is formed in units of stores (affiliate stores).

That is, a consumption group of consumers having a credit card of the same credit card company is formed centering on a purchaser in units of affiliate stores (sellers).

For example, among customers who visited a restaurant whose name is "delicious house", customers having a personal relation (a personal interchange relation (personal connection relation) such as a relative relation, a company college relation, or a friend relation) substantively form one consumption group. However, the restaurant does not know that they are a consumption group having a personal interchange relation, and customers having a person interchange relation does not recognize that they form a consumption group.

In the present invention, by substantively forming a network (consumption group) of customers visiting the restaurant, the restaurant can conduct after-marketing to the customers belonging to the substantively formed consumption group or acquaintances of the customers, and thus the restaurant can conduct effective marketing at a relative low cost. The customers belonging to the consumption group is recognized by the seller as the consumption group other than individuals and so can receive better services from the seller. In addition, promotion for the restaurant can be more actively conducted between members of the social marketing group.

The substantively formed consumption group is formed such that a social marketing group which is a consumption group is formed, centering on an A credit card member (purchaser) who visited the restaurant "delicious house" which is an affiliate store of an A credit company, by subscribers who are the membership of the A credit card company and have a personal interchange relation with the purchaser as shown in FIG. 3.

That is, for each of affiliate stores, formed are a plurality of consumption groups (social marketing groups 1, 2, 3, and the like) composed of people who have an interchange relation with the existing purchasers through the social network service and have a credit card of the same credit card company.

In the example of FIG. 3, one credit company and one social network service are shown, however, the present invention is not limited thereto. For example, a plurality of credit card companies may be associated with one social network service, one credit card company may be associated with a plurality of social network services, or a plurality of credit card companies may be associated with a plurality of social network services.

A more detailed description will be made below in connection with a method of generating a consumption group (a social marketing group of each affiliate store) of a novel concept. First, a method of generating marketing group information for online after-marketing will be described with reference to FIG. 4.

Figure 4:
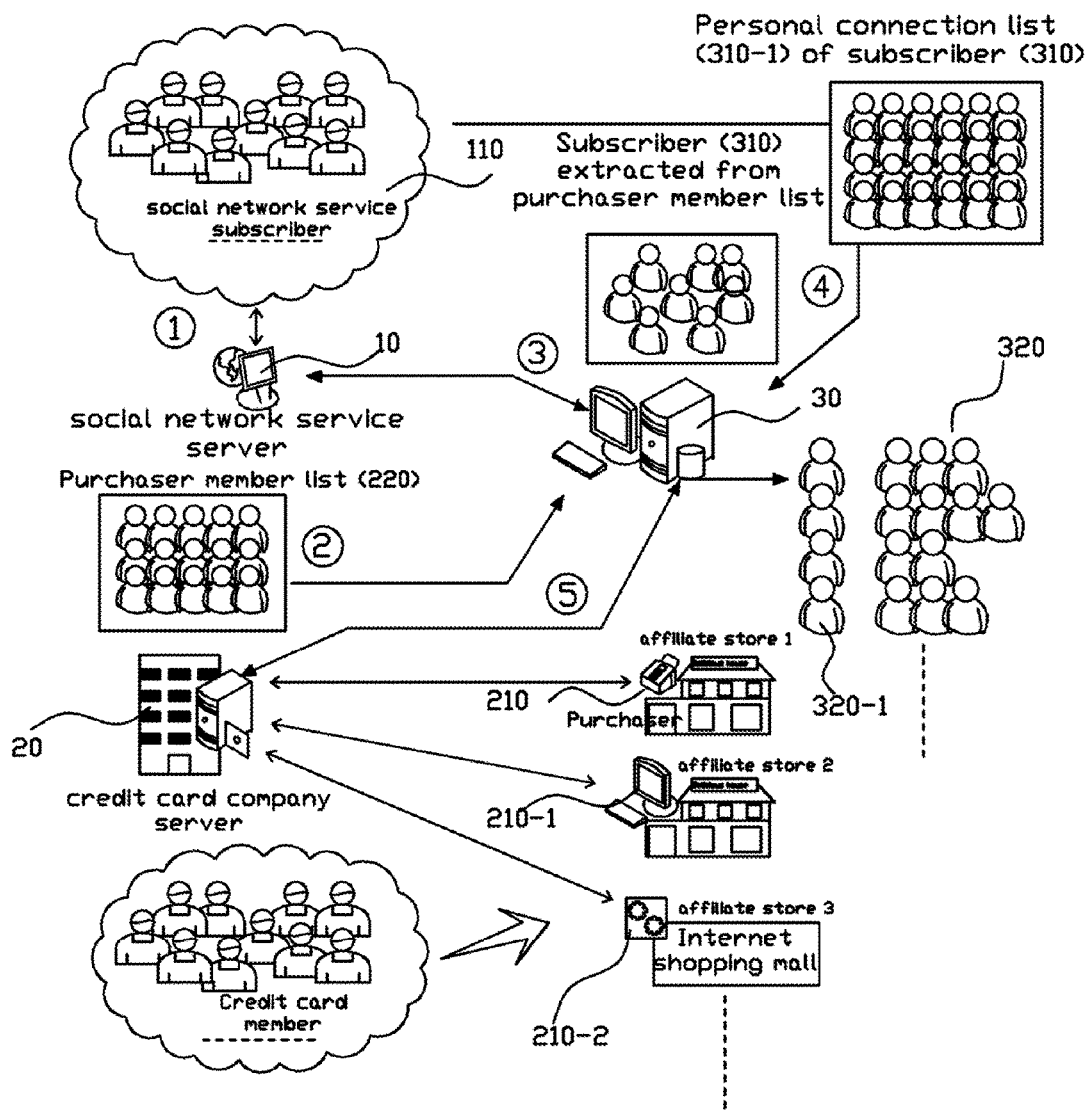
FIG. 4 is a diagram for explaining a method of generating social marketing group information of each affiliate store in which credit card payment information is associated with social network information according to the present invention.

FIG. 4 is a diagram for explaining a method of generating social marketing group information of each affiliate store in which credit card payment information is associated with social network information. As shown in FIG. 4, in a first step, a process of obtaining consent to the use of subscriber information from a social network service subscriber 110 through a social network service server 10 is performed (①). The first step of obtaining consent to the use of subscriber information is performed by a method, typically used online, of providing the subscriber with information about the use of subscriber information and obtaining the subscriber's consent from the subscriber.

The social network service server 10 is run by a service provider that provides a service for forming a personal connection between individuals such as "nate-on", "msn", "twitter", "facebook", "cyworld", or "kakao talk". Social network service servers of various forms may be used as the social network service server 10.

Then, in a second step, a credit card company server 20 receives credit card payment information from a credit card reader 210, a point-of-sale (POS) system 210-1, or an Internet credit card payment means 210-2, which is a credit card payment means installed in an affiliate store (selling store), forms a purchase member list 220, which is information of credit card members who have made a payment by a credit card during a predetermined time period, in units of affiliate stores, and transmits the purchase member list 220 to a social marketing server 30 (②).

The credit card company server 20 is a server, run by a credit card company, which performs a credit card-related process. That is, the credit card company server 20 recruits credit card members of a credit card such as a BC card, a Hyundai card, a Kookmin card, or a Lotte card, and performs a process for credit card payment of the credit card members. The credit card company server 20 receives credit card payment data from the credit card reader 210, the POS system 210-1, or the Internet credit card payment means 210-2, which is installed in each of a plurality of affiliate stores having an affiliate contract with the credit card company, performs payment approval and a series of information processes, and generates the purchase member list 220 of each affiliate store by listing purchasers who have made a credit card payment in each affiliate store during a predetermined time period.

For example, the credit card company server 20 generates a purchase member list of an affiliate store 1, which is an offline store in which the credit card reader 210 is installed, using credit card payment information received from the affiliate store 1, generates a purchase member list of an affiliate store 2, which is an offline store in which the POS system 210-1 is installed, using credit card payment information received from the affiliate store 2, and generates a purchase member list of an affiliate store 3, which is an online store (Internet shopping mall) in which the Internet credit card payment means 210-2 is installed, using credit card payment information received from the affiliate store 3. Then, the credit card company server 20 transmits the purchase member list 220 to the social marketing server 30.

The purchase member list 220 generated in the second step may further include product information of a purchased product, purchase time information, and payment amount information.

For example, when the seller (affiliate store) is an online shopping mall selling "books", the purchase member list 220 may further include purchased book information as the product information, a time when a purchased book is sold, selling price information, or the like.

That is, when the purchase member list 220 is generated, the credit card company server 20 may include affiliate store information, information of a product purchased at an affiliate store, purchase time information, payment amount information, or the like in the purchase member list 220 together with identification information of the credit card member. The purchase member list 220 having such information may be used for analysis of a purchaser consumption pattern or as marketing information.

Then, the social marketing server 30 extracts a subscriber 310 subscribing to the social network service from the purchase member list 220 in cooperation with the social network service server 10 (③).

Then, in a third step, when a purchase member included in the purchase member list 220 is the subscriber 110 of the social network service, the social marketing server 30 requests the social network service server 10 to transmit personal connection information of the purchase member (a credit card member determined as a reference member/subscriber), and the social network service server 10 transmits personal connection list information 310-1 which is information of other subscribers with whom the purchase member has an interchange relation to the social marketing server 30 (④).

That is, in the third step, it is determined whether or not the purchaser is the social network service subscriber, and when the purchaser is the social network service subscriber, information of other subscribers with whom the purchaser has an interchange relation is provided. The social marketing server 30 provides a code value or identification information of the purchaser included in the purchase member list 220 to the social network service server 10. The social network service server 10 extracts a subscriber (a purchase member) subscribing to the social network service from among the purchase members included in the purchase member list 220, and then provides a personal connection list (for example, a relative list or a friend list) including subscribers with whom the purchaser (purchase member) has an interchange relation (for example, a relative or a registered friend) to the social marketing server 30.

The social marketing server 30 may be provided with the personal connection list information 310-1 from a plurality of different social network service servers 10 that provide different social network services. Thus, the purchase member who is the subscriber of the social network service serves as a reference member 320-1 when the social marketing group information is generated later.

Then, in a fourth step, the social marketing server 30 checks whether or not the subscribers included in the personal connection list 310-1 received from the social network service server 10 are the members of the credit card company in cooperation with the credit card company server 20, and then extracts credit card members from the personal connection list (⑤).

That is, in the fourth step, credit card members who have a personal connection relation, that is, an interchange relation by social network service with the purchase member are extracted.

In a fifth step, the social marketing server 30 generates social marketing group information 320 of each purchase member (reference member) for each affiliate store using information of each purchase member subscribing to the social network service and information of credit card members having a personal connection relation with each purchase member, and stores the social marketing group information 320 in a database.

For example, let us assume that a purchase member who has made a payment at a restaurant B using a credit card A is connected to 10 company colleagues, 5 school friends, 5 family members, and 10 juniors, that is, a total of 30 subscribers registered to "nate on" which is a social network service. If 20 subscribers are members of the credit card A, the 20 subscribers become members of the social marketing group of the purchase member.

Then, the social marketing group information stored in the database is provided to members who are not only credit card members but also social network service subscribers and the affiliate store through the social marketing server 30 so that it can be recognized that the social marketing group of the affiliate store (selling store) was formed.

That is, the members of the social marketing group can recognize the social marketing group of the selling store. In particular, the existing purchaser who is the reference member becoming a reference when the social marketing group is generated can conduct promotion for the selling store to his/her social marketing group using word of mouth or other online services (blog, online café, Twitter, or the like). The selling store can also recognizes the social marketing group and provide better services or benefits to the social marketing group, so that customer management and promotion can be easily conducted.

The social marketing group information may be provided to the affiliate store and the social marketing group members through the social marketing server 30 as follows. For example, when the affiliate store or the member logs in a web page provided by the social marketing server 30 using predetermined identification information or specific number such as a credit card number, a social security number, an affiliate store number, or a business number, the social marketing group information of a list form is provided to the affiliate store, and an affiliate store list and the social marketing group information included in each affiliate store list are provided to the member.

A more detailed description will be made in connection with the method of generating the social marketing group.

Figure 5:
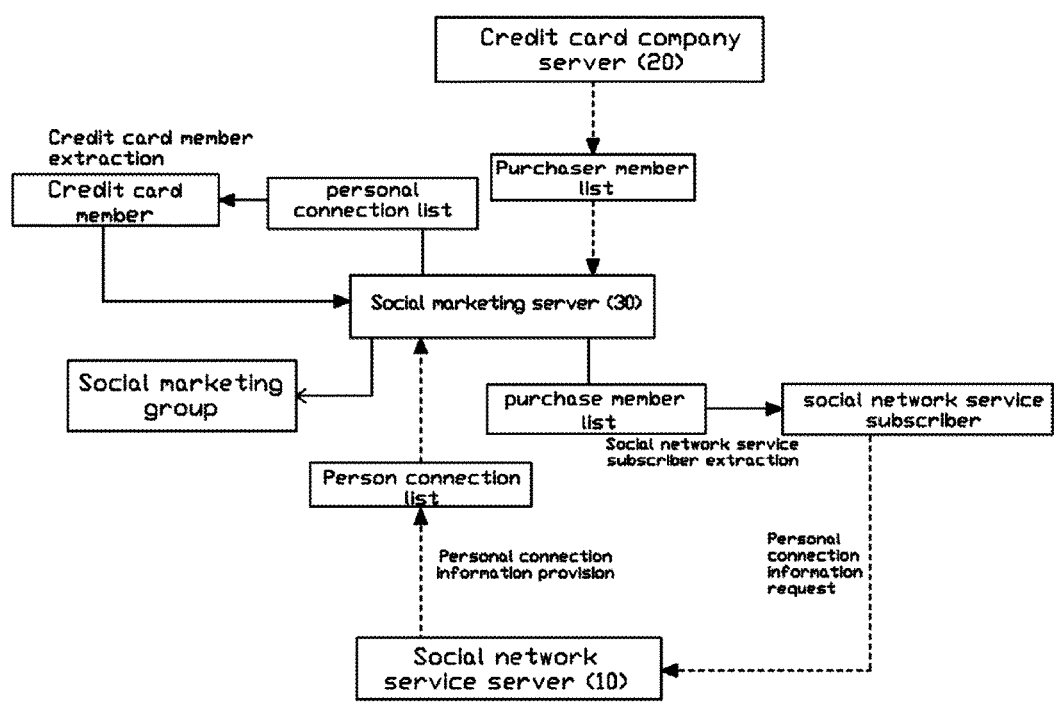
FIG. 5 is a diagram a method of generating social marketing group information of each affiliate store in which credit card payment information is associated with social network information according to the present invention.

FIG. 5 is a diagram illustrating the flow of data for explaining a method of generating social marketing group information of each affiliate store in which credit card payment information is associated with social network information. As shown in FIG. 5, the credit card company server 20 transmits a purchase member list to the social marketing server 30.

Then, the social marketing server 30 extracts a social network service subscriber from the purchase member list in cooperation with the social network service server 10. Then, the social marketing server 30 requests the social network service server 10 to transmit personal connection information of the extracted subscriber.

The social network service server 10 transmits a personal connection list of the subscriber to the social marketing server 30.

The social marketing server 30 extracts a credit card member from subscribers included in the personal connection list in cooperation with the credit card company server 20, and forms a social marketing group by combining the social network service subscriber extracted from the purchase member list with the credit card member extracted from the personal connection list.

Next, a description will be made in connection with an after-marketing method intended for the social marketing group of each affiliate store in which the credit card payment information is associated with the social network information.

After-Marketing Method According to First Embodiment

Figure 6:
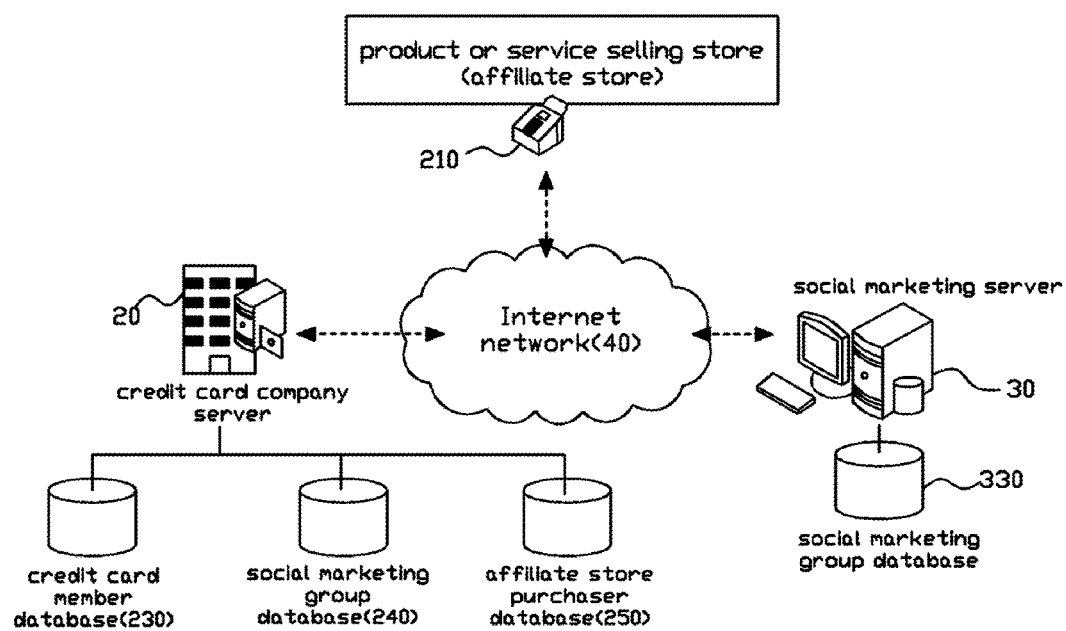
FIG. 6 is a diagram illustrating a system for implementing an after-marketing method intended for a social marketing group of each affiliate store according to a first embodiment of the present invention.

The after-marketing according to the present invention is performed based on the social marketing group information generated in the above described way. FIG. 6 is a diagram illustrating a system for implementing an after-marketing method intended for a social marketing group of each affiliate store according to a first embodiment of the present invention. As shown in FIG. 6, a system for implementing an after-marketing method according to the first embodiment of the present invention includes the social marketing server 30 including a social marketing group database 330, the credit card company server 20 that receives payment information from the credit card payment means 210, generates the purchaser list, and provides a benefit to a social marketing purchaser, and an Internet network 40 for data communications between the social marketing server 30 and the credit card company server 20 or between the credit card company server 20 and the social marketing server 30.

In particular, the credit card company server 20 includes a credit card member database 230 storing credit card member information, a social marketing group database 240 storing social marketing group information which is received and updated from the social marketing server 30, and an affiliate store purchaser database 250.

Figure 7:
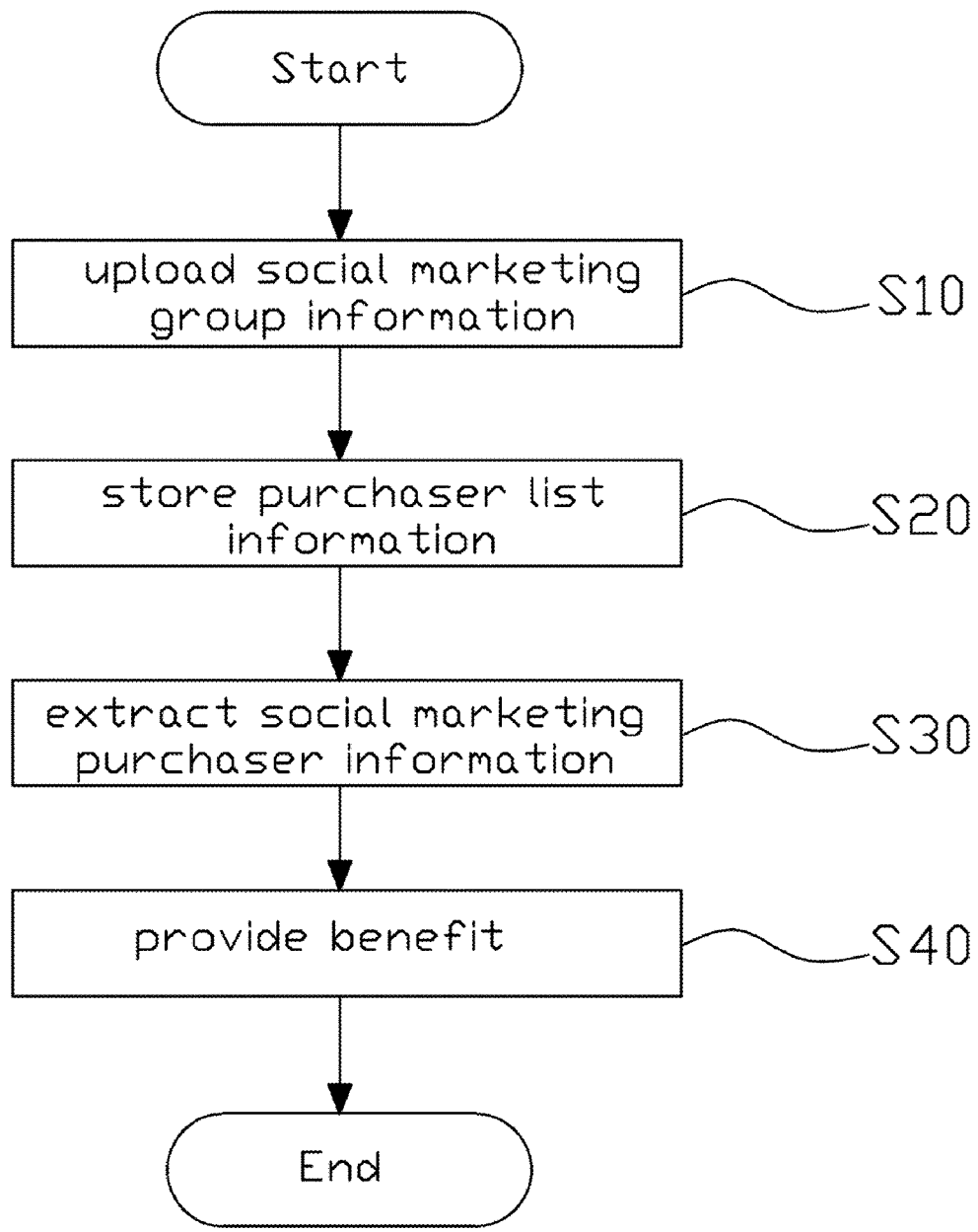
FIG. 7 is a flowchart illustrating an after-marketing method intended for the social marketing group of each affiliate store according to the first embodiment of the present invention.

FIG. 7 is a flowchart illustrating an after-marketing method intended for the social marketing group of each affiliate store according to the first embodiment of the present invention. As shown in FIG. 7, the after marketing method according to the first embodiment of the present invention includes steps of: uploading social marketing group information (S10); storing purchaser list information (S20), extracting social marketing purchaser information (S30), and providing a benefit (S40).

In step S10 of uploading the social marketing group information, the credit card company server 20 constructs the social marketing group database 240 by receiving or updating the social marketing group information from the social marketing server 30 having the already generated social marketing group information.

After the social marketing group database 240 is constructed, in step S20 of storing the purchaser list, credit card payment information including payment time information and payment amount information of a plurality of credit card members is received from the credit card payment means 210 installed in each of a plurality of affiliate stores, and the purchaser list is stored for each affiliate store, so that the affiliate store purchaser database is constructed.

Then, in step S30 of extracting the social marketing purchaser information, social marketing purchaser information is extracted such that the social marketing purchaser included in the social marketing group is extracted from the purchaser list by comparing the social marketing group information of the same affiliate store as the purchaser list information stored for each affiliate store with the purchaser list.

That is, members of the social marketing group are extracted from the purchasers of each affiliate store by comparing the social marketing group information stored in the social marketing group database 240 with the purchaser list information stored in the affiliate store purchaser database 250.

Then, in step S40 of providing the benefit, the credit card company server 20 decides a beneficiary among the extracted members, that is among the purchasers, and provides the beneficiary a benefit such as a coupon, a gift card, or a point provided from the affiliate store.

At this time, in step S20 of storing the purchaser list information, the credit card payment information may further include product information of a product sold in the affiliate store, and in step S40 of providing the benefit, the benefit is provided based on the sold product.

That is, the benefit may differ according to a product, or the benefit for a predetermined product may differ according to the social marketing group.

For example, a selling store (affiliate store) selling jewelry may set the benefit at differential rates according to a sold product. For example, a benefit for watches may be set to 3% of a selling price, a benefit for earnings may be set to 5% of a selling price, a benefit for rings may be set to 7% of a selling price, and a benefit for necklaces may be set to 10% of a selling price. In this way, the seller can conduct marketing or promotion for a product which is bad in sales or intended for an event or a new product.

If members of a certain social marketing group purchase only watches, the benefit for purchase of watches may be raised from 3% to 5%, so that purchase and promotion for watches can be more actively conducted.

In step S40 of providing the benefit, the benefit may be decided based on a total of the amount of purchases that the social marketing group has made during a predetermined time period.

For example, let us assume that 10% of the amount of purchases that the social marketing group has made during one month is set as the benefit. In this case, when a total of the amount of purchase of a social marketing group A is 5 million won, 5 hundred thousand won is paid to the social marketing group A as the benefit. At this time, 5 hundred thousand won may be paid by means of a gift card, a point, or cash.

The beneficiary of the benefit is decided from the social marketing group according to the form of the benefit. In the case of a coupon, a coupon may be given to all members, and in the case of the benefit for selling, the benefit may be given to only members who made a purchase. Alternatively, the benefit may be given to the reference member of the social marketing group, that is, the reference purchase member serving as a reference when the social marketing group is generated.

The beneficiary may be decided according to an order of time when payment is made within the social marketing group. For example, a member who made a payment first may receive the benefit for payment amount or a purchase product of a member who made a payment later. That is, a member who made a payment first may be a beneficiary with respect to a member who made a payment later.

As described above, the beneficiary may be decided by various methods according to a form of a benefit, a business form, and a selling method.

After-Marketing Method According to Second Embodiment

Figure 8:
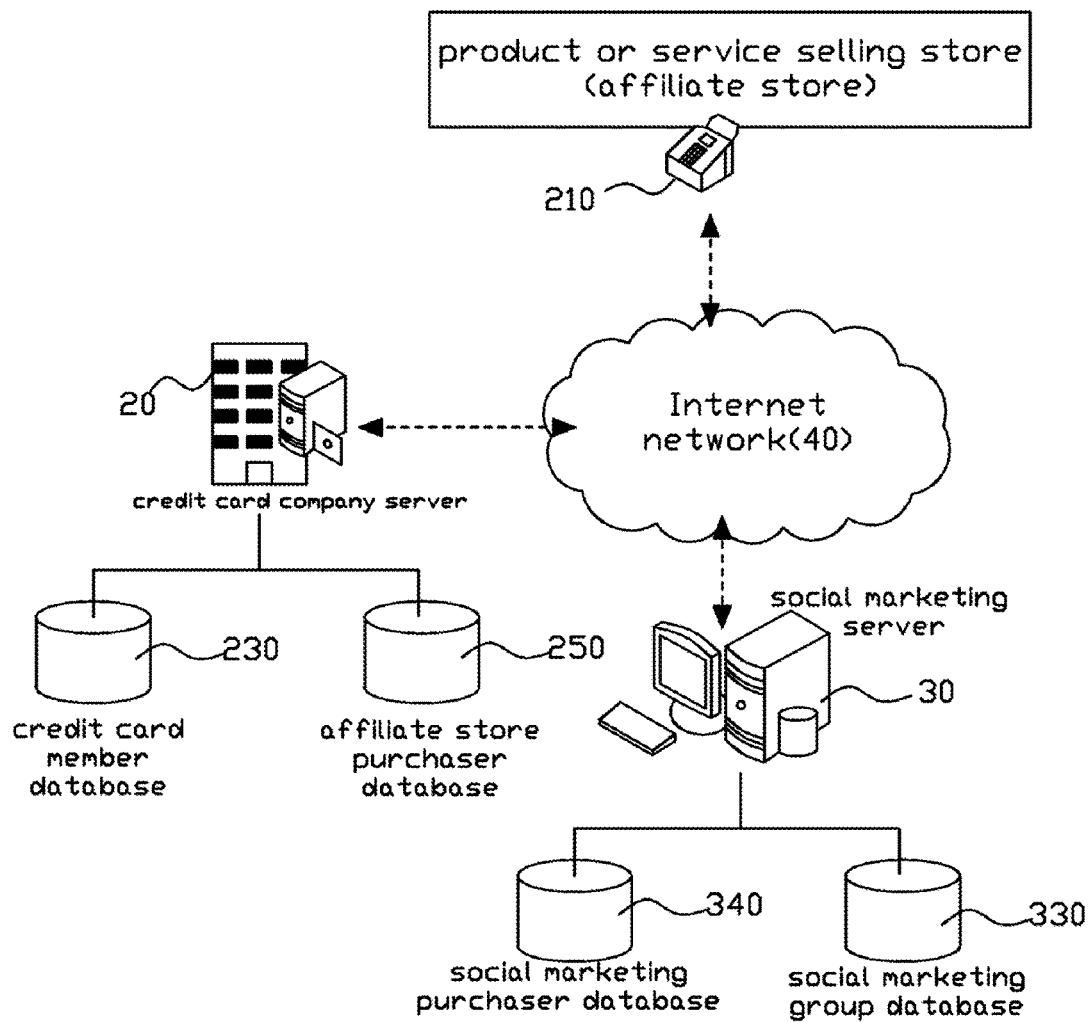
FIG. 8 is a diagram illustrating a system for implementing an after-marketing method intended for a social marketing group of each affiliate store according to a second embodiment of the present invention.

FIG. 8 is a diagram illustrating a system for implementing an after-marketing method intended for a social marketing group of each affiliate store according to a second embodiment of the present invention. As shown in FIG. 8, a system for implementing an after-marketing method according to the second embodiment of the present invention includes the social marketing server 30 including a social marketing group database 330, the credit card company server 20 that receives payment information from the credit card payment means 210, generates the purchaser list, and provides the benefit to a social marketing purchaser, and an Internet network 40 for data communications between the social marketing server 30 and the credit card company server 20 or between the credit card company server 20 and the social marketing server 30.

In particular, the social marketing server 30 includes a social marketing group database 330 storing social marketing group information of the purchase member (reference member) for each affiliate store and a social marketing purchaser database 340. The social marketing server 30 compares the social marketing group information of the same affiliate store as the purchaser list information provided from the credit card company server 20 with the purchaser list, extracts the social marketing purchaser included in the social marketing group from the purchaser list, generates the social marketing purchaser information, stores the social marketing purchaser information in the social marketing purchaser database 340, and transmits the social marketing purchaser information to the credit card company server 20.

Figure 9:
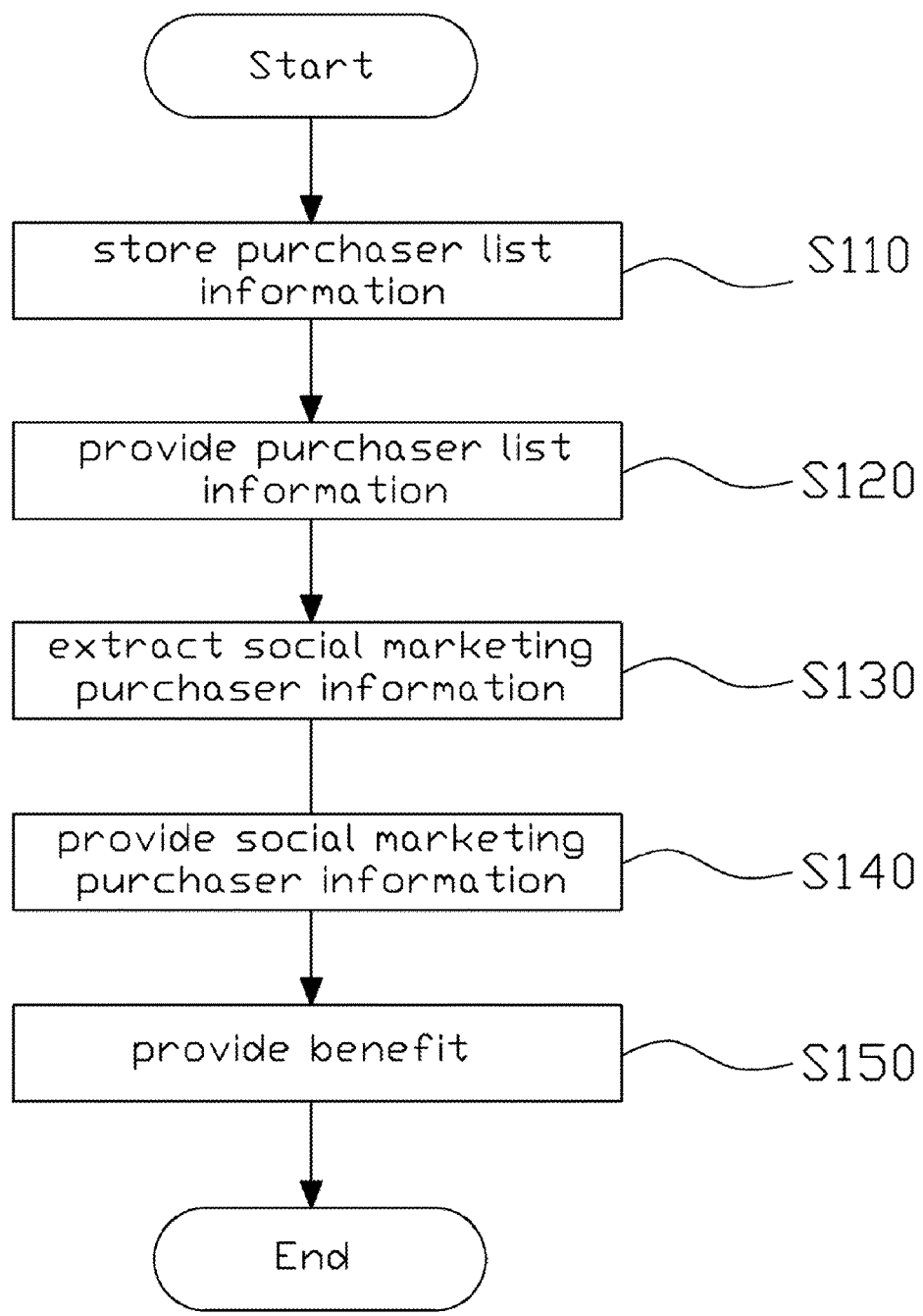
FIG. 9 is a flowchart illustrating the after-marketing method intended for the social marketing group of each affiliate store according to the second embodiment of the present invention.

FIG. 9 is a flowchart illustrating the after-marketing method intended for the social marketing group of each affiliate store according to the second embodiment of the present invention. As shown in FIG. 9, the after marketing method according to the first embodiment of the present invention includes steps of: storing purchaser list information (S110), providing the purchaser list information (S120), extracting social marketing purchaser information (S130), providing the social marketing purchaser information (S140), and providing a benefit (S150).

In step S110 of storing the purchaser list information, information about credit card payment made at an affiliate store is collected. The credit card company server 20 receives credit card payment information of a plurality of credit card members from each of credit card payment means 210 installed in a plurality of affiliate stores, generates the purchaser list information for each affiliate, and stores the purchaser list information in the affiliate purchaser database 250.

In step S120 of providing the purchaser list information, the purchaser list information is provided to the social marketing server 30 having the social marketing group information. The credit card company server 20 transmits the purchaser list information stored for each affiliate store to the social marketing server 30.

In step S130 of extracting the social marketing purchaser information, purchasers included in the social marketing group of each affiliate store are extracted from the purchaser list of each affiliate store. The social marketing server 30 compares the social marketing group information of the same affiliate store as the purchaser list information with the purchaser list, extracts the social marketing purchaser included in the social marketing group from the purchaser list, and the extracted social marketing purchaser in the social marketing purchaser database 340.

In step S140 of providing the social marketing purchaser information, in order to provide the purchaser belonging to the social marketing group with a service or benefit provided by the affiliate store through the credit card company server 20, information of purchasers belonging to the social marketing group is provided to the credit card company server 20. The social marketing server 30 transmits the extracted social marketing purchaser information to the credit card company server 20.

In step S150 of providing the benefit, a beneficiary may be decided using the social marketing purchaser information through the credit card company server 20, and the benefit such as a coupon, a gift card, or a pint provided by the affiliate store may be provided to the beneficiary.

At this time, in step S150 of providing the benefit, as described above in the first embodiment, the benefit may be decided based on a total of the amount of purchases that the social marketing group has made during a predetermined time period. The beneficiary who is provided with the benefit may be limited to the purchase member who served as a reference when the social marketing group information is generated.

Figure 10:
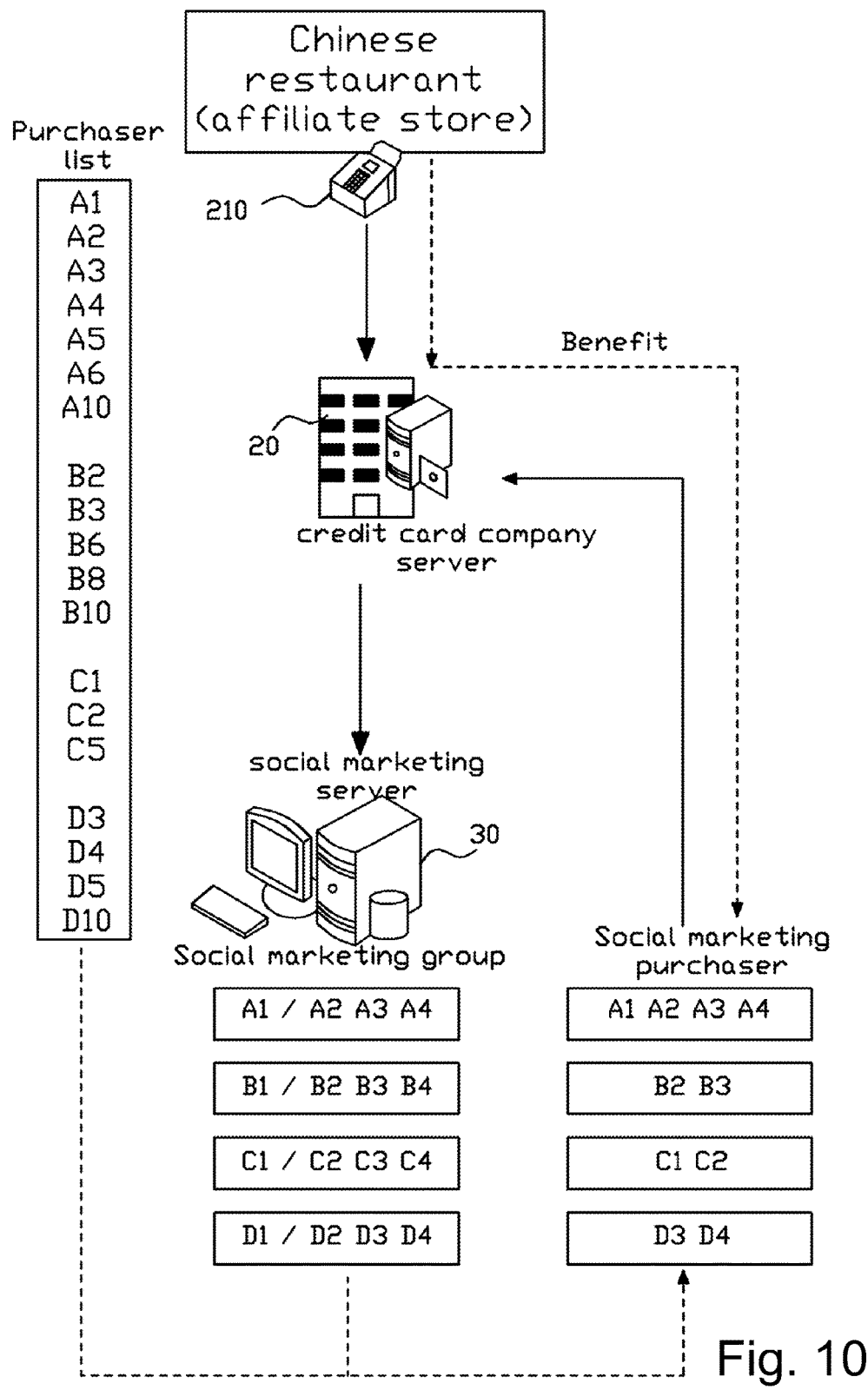
FIG. 10 is a diagram for specifically explaining an after-marketing method intended for the social marketing group of each affiliate store according to the second embodiment of the present invention.

FIG. 10 is a diagram for specifically explaining the after-marketing method intended for the social marketing group of each affiliate store according to the second embodiment of the present invention. Let us assume that a Chinese restaurant has a social marketing group composed of members A1 to A4, a social marketing group composed of members B1 to B4, a social marketing group composed of members C1 to C4, and a social marketing group composed of members D1 to D4 as shown in FIG. 10. In a state in which the above social marketing group information is stored in the database of the social marketing server 30, the credit card company server 20 generates a list of purchasers A1, A2, . . . , and D10 which is a list of members whose payment has been approved by the credit card reader 210 installed in the Chinese restaurant.

The credit card company server 20 transmits the purchaser list to the social marketing server 30 having the social marketing group information.

The social marketing server 30 compares the purchaser list with the social marketing group, and extracts social marketing purchasers by extracting purchasers A1, A2, A3, B2, B3, C1, C2, D3, and D4 belonging to the social marketing group of the affiliate store from the purchaser list.

The social marketing server 30 transmits the social marketing purchaser information (A1, A2, A3, B2, B3, C1, C2, D3, and D4) to the credit card company server 20.

The credit card company server 20 decides a beneficiary and provides the beneficiary with a benefit, such as cash, a coupon, a gift card, or a point, provided by the affiliate store.

The members A1, A2, A3, B2, B3, C1, C2, D3, and D4 who have made a purchase may be decided as the beneficiaries, or the reference members A1, B1, C1, and D1 of the social marketing groups may be decided as the beneficiaries. Alternatively, a member who has made a payment for purchase first in terms of time may receive the benefit according to the amount of payment of a member who made a payment for purchase later.

The exemplary embodiments of the present invention have been described above, but the technical spirit of the present invention is not limited to the above embodiments. It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of generating social marketing group information, in which credit card payment information is associated with social network information, used for online after-marketing, the method comprising:
    at a social network service server that provides a social network service, obtaining consent to a use of subscriber information from a social network service subscriber;
    at a credit card company server, receiving credit card payment information from a credit card payment processor installed in an affiliate store, generating a purchase member list of each affiliate store, and transmitting the purchase member list to a social marketing server;
    at the social marketing server, extracting a social network service subscriber from the purchase member list in cooperation with the social network service server and requesting the social network service server to transmit a personal connection list of a purchase member when the purchase member is the social network service subscriber;
    at the social network service server, transmitting the personal connection list which is a list of other subscribers with whom the purchase member has an interchange relation to the social marketing server; and
    at the social marketing server, checking whether or not social network service subscribers included in the personal connection list received from the social network service server are credit card members in cooperation with the credit card company server, extracting credit card members included in the personal connection list, generating information of a social marketing group of the purchase member of each affiliate store composed of the credit card members extracted from the personal connection list, and storing the information of the social marketing group in a database,
    wherein the generated information of the social marketing group is used for an after-marking method comprising:
    at the credit card company server, storing the information of the social marketing group received and updated from the social marketing server and constructing a database;
    at the credit card company server, receiving credit card payment information including payment time information and payment amount information of a plurality of credit card members from the credit card payment processor installed in each of a plurality of affiliate stores, and storing purchaser list information for each affiliate store;
    at the credit card company server, comparing the information of the social marketing group of the same affiliate store as the purchase list information stored for each affiliate store with the purchaser list, and extracting a social marketing purchaser belonging to the social marketing group from the purchaser list; and
    at the credit card company server, deciding a beneficiary from among members of the social marketing group using information of the social marketing purchaser, and providing the decided beneficiary with a benefit provided from the affiliate store.

2. The method according to claim 1, wherein the social network service server includes a plurality of social network service servers that provide different social network services from each other, and the social marketing server receives personal connection lists of purchase members from the plurality of social network service servers.

3. The method according to claim 1, wherein the credit card payment processor is any one of a credit card reader, a point of sale (POS) system located at a counter of the affiliate store, or an Internet credit card payment processor.

4. The method according to claim 1, further comprising, at the social marketing server, providing information of the social marketing group to the credit card members belonging to the social marketing group and the affiliate store.

5. The method according to claim 1, wherein the credit card payment information further includes product information about a product sold in the affiliate store, and the benefit is provided to the beneficiary based on a sold product according to the product information included in the credit card payment information.

6. The method according to claim 1, wherein the benefit is decided based on a total of the amount of purchases made by the social marketing group during a predetermined time period.

7. The method according to claim 1, wherein a purchase member who became a reference when the information of the social marketing group is generated is decided as a beneficiary who receives a benefit for the amount of purchases of the social marketing group.

8. A method of generating social marketing group information, in which credit card payment information is associated with social network information, used for online after-marketing, the method comprising:
    at a social network service server that provides a social network service, obtaining consent to a use of subscriber information from a social network service subscriber;
    at a credit card company server, receiving credit card payment information from a credit card payment processor installed in an affiliate store, generating a purchase member list of each affiliate store, and transmitting the purchase member list to a social marketing server;
    at the social marketing server, extracting a social network service subscriber from the purchase member list in cooperation with the social network service server and requesting the social network service server to transmit a personal connection list of a purchase member when the purchase member is the social network service subscriber;
    at the social network service server, transmitting the personal connection list which is a list of other subscribers with whom the purchase member has an interchange relation to the social marketing server; and
    at the social marketing server, checking whether or not social network service subscribers included in the personal connection list received from the social network service server are credit card members in cooperation with the credit card company server, extracting credit card members included in the personal connection list, generating information of a social marketing group of the purchase member of each affiliate store composed of the credit card members extracted from the personal connection list, and storing the information of the social marketing group in a database, wherein the generated information of the social marketing group is used for an after-marking method comprising:

at the credit card company server, receiving credit card payment information including payment time information and payment amount information of a plurality of credit card members from the credit card payment processor installed in each of a plurality of affiliate stores, and storing purchaser list information for each affiliate store;

at the credit card company server, providing the purchaser list information stored for each affiliate store to the social marketing server;

at the social marketing server, comparing the information of the social marketing group of the same affiliate store as the purchase list information with the purchaser list, and extracting a social marketing purchaser belonging to the social marketing group from the purchaser list;

at the social marketing server, providing information of the extracted social marketing purchaser to the credit card company server; and at the credit card company server, deciding a beneficiary from among members of the social marketing group using information of the social marketing purchaser, and providing the decided beneficiary with a benefit provided from the affiliate store.

9. The method according to claim 8, wherein the credit card payment information further includes product information about a product sold in the affiliate store, and the benefit is provided to the beneficiary based on a sold product according to the product information included in the credit card payment information.

10. The method according to claim 8, wherein the benefit is decided based on a total of the amount of purchase made by the social marketing group during a predetermined time period.

11. The method according to claim 8, wherein a purchase member who became a reference when the social marketing group information is generated is decided as a beneficiary who receives a benefit for the amount of purchase of the social marketing group.

12. The method according to claim 8, wherein the social network service server includes a plurality of social network service servers that provide different social network services from each other, and the social marketing server receives personal connection lists of purchase members from the plurality of social network service servers.

13. The method according to claim 8, wherein the credit card payment processor is any one of a credit card reader, a point of sale (POS) system located at a counter of the affiliate store, or an Internet credit card payment processor.

14. The method according to claim 8, further comprising, at the social marketing server, providing information of the social marketing group to the credit card members belonging to the social marketing group and the affiliate store.

* * * * *